_(12)_ United States Patent
Pantelidou et al.

(10) Patent No.: US 9,531,523 B2
(45) Date of Patent: Dec. 27, 2016

(54) SECTORIZATION FOR GROUPING TERMINALS

(71) Applicant: Broadcom Corporation, Irvine, CA (US)

(72) Inventors: Anna Pantelidou, Oulu (FI); Jari Tapani Westman, Oulu (FI)

(73) Assignee: BROADCOM CORPORATION, Irvine, CA (US)

( * ) Notice: Subject to any disclaimer, the term of this patent is extended or adjusted under 35 U.S.C. 154(b) by 62 days.

(21) Appl. No.: 14/021,373

(22) Filed: Sep. 9, 2013

(65) Prior Publication Data

US 2014/0071847 A1 Mar. 13, 2014

(30) Foreign Application Priority Data

Sep. 13, 2012 (GB) .................................. 1216365.5

(51) Int. Cl.
| | |
|---|---|
| *G08C 17/00* | (2006.01) |
| *H04B 7/00* | (2006.01) |
| *H04L 5/00* | (2006.01) |
| *H04L 1/00* | (2006.01) |
| *H04W 48/00* | (2009.01) |
| *H04W 48/16* | (2009.01) |
| *H04W 48/20* | (2009.01) |

(52) U.S. Cl.
CPC .............. *H04L 5/0069* (2013.01); *H04L 1/00* (2013.01); *H04W 48/00* (2013.01); *H04W 48/16* (2013.01); *H04W 48/20* (2013.01)

(58) Field of Classification Search
CPC ......... H04L 1/00; H04L 5/0069; H04W 48/00; Y02B 60/50
See application file for complete search history.

(56) References Cited

U.S. PATENT DOCUMENTS

| | | | | |
|---|---|---|---|---|
| 6,021,123 | A * | 2/2000 | Mimura ................ | H04W 36/18 370/331 |
| 7,502,340 | B1 * | 3/2009 | Chuang et al. ............. | 370/318 |
| 7,545,740 | B2 * | 6/2009 | Zelig ..................... | H04L 45/245 370/230 |

(Continued)

FOREIGN PATENT DOCUMENTS

| | | |
|---|---|---|
| GB | 2384393 | 7/2003 |
| WO | 2009014278 | 1/2009 |
| WO | 2012129400 | 9/2012 |

*Primary Examiner* — Khaled Kassim
*Assistant Examiner* — Berhanu Belete
(74) *Attorney, Agent, or Firm* — Oblon, McClelland, Maier & Neustadt, L.L.P.

(57) ABSTRACT

A geographic region in which an access point AP lies is divided into sectors, each sector associated with a group; and a station is assigned to a group based on location information of the station relative to the sectors. The station can assign itself to a group autonomously, after determining the number of groups from signalling received from the AP. Or the AP can do the group assignments, such as by assessing distance between adjacent stations. The AP can utilize the station's location information to test whether a first link between the station and a first node of a first group is sufficient. If the test indicates that the first link is sufficient the AP can assign the station to the first group, else it will utilize the location information to test whether a second link between the station and a second node of a second group is sufficient.

9 Claims, 6 Drawing Sheets

(56) References Cited

U.S. PATENT DOCUMENTS

| | | | | |
|---|---|---|---|---|
| 7,626,930 B2* | 12/2009 | Agmon | H04L 12/4641 | 370/230 |
| 8,917,705 B2* | 12/2014 | Merlin et al. | | 370/336 |
| 2002/0197997 A1* | 12/2002 | Attar | H04L 1/20 | 455/446 |
| 2003/0190030 A1* | 10/2003 | Alton | H04W 76/068 | 379/219 |
| 2004/0106412 A1* | 6/2004 | Laroia | H04W 16/12 | 455/448 |
| 2004/0248589 A1* | 12/2004 | Gwon | G01S 5/0252 | 455/456.1 |
| 2006/0166699 A1* | 7/2006 | Aghvami | H04L 12/5695 | 455/552.1 |
| 2007/0189204 A1* | 8/2007 | Li et al. | | 370/328 |
| 2008/0002652 A1* | 1/2008 | Gupta et al. | | 370/338 |
| 2008/0025337 A1* | 1/2008 | Smith | H04W 72/005 | 370/439 |
| 2008/0062925 A1* | 3/2008 | Mate | H04W 52/244 | 370/331 |
| 2008/0186901 A1* | 8/2008 | Itagaki et al. | | 370/315 |
| 2008/0212519 A1* | 9/2008 | Fang | H04W 72/005 | 370/320 |
| 2009/0080373 A1* | 3/2009 | Song | H04L 12/185 | 370/328 |
| 2009/0122887 A1* | 5/2009 | Li | H04L 5/0046 | 375/260 |
| 2010/0034177 A1* | 2/2010 | Santhanam | H04W 74/0883 | 370/338 |
| 2010/0054170 A1* | 3/2010 | Zhu | H04W 72/04 | 370/315 |
| 2010/0136998 A1* | 6/2010 | Lott | H04W 16/14 | 455/453 |
| 2010/0220671 A1* | 9/2010 | Guillouard | H04B 7/024 | 370/329 |
| 2010/0304745 A1* | 12/2010 | Patel et al. | | 455/435.1 |
| 2011/0090803 A1* | 4/2011 | Etkin | H04W 40/023 | 370/252 |
| 2011/0149822 A1* | 6/2011 | Sammour | H04W 4/08 | 370/311 |
| 2011/0182225 A1* | 7/2011 | Song | H04W 76/002 | 370/312 |
| 2012/0052796 A1* | 3/2012 | Takano | | 455/7 |
| 2012/0120892 A1* | 5/2012 | Freda | H04W 8/005 | 370/329 |
| 2012/0129543 A1* | 5/2012 | Patel | H04N 7/15 | 455/456.1 |
| 2012/0214488 A1* | 8/2012 | Busropan | H04W 4/005 | 455/435.1 |
| 2012/0219097 A1* | 8/2012 | McCloud | H04L 25/03242 | 375/341 |
| 2012/0221639 A1* | 8/2012 | Mallet et al. | | 709/204 |
| 2013/0064166 A1* | 3/2013 | Calcev | H04W 4/08 | 370/312 |
| 2013/0195081 A1* | 8/2013 | Merlin et al. | | 370/336 |
| 2013/0229959 A1* | 9/2013 | Ghosh | H04W 74/08 | 370/311 |
| 2013/0229988 A1* | 9/2013 | Ghosh et al. | | 370/329 |
| 2013/0301605 A1* | 11/2013 | Kim | H04L 1/00 | 370/330 |
| 2014/0056190 A1* | 2/2014 | Qian | H04W 28/048 | 370/280 |

\* cited by examiner

202: utilize location information for a STA to test whether a first link between the STA and a first node of a first group is sufficient 204:
- assign the STA to the first group if the test indicates that the first link is sufficient,
- else utilize the location information to test whether a second link between the STA and a second node of a second group is sufficient 206: the test whether the first link is sufficient is a two way test comprising a test of the link from the first node to the STA and a test of the link from the STA to the first node 208: the respective test is whether at least transmit power on the respective $1^{st}/2^{nd}$ link is sufficient to support the respective $1^{st}/2^{nd}$ link, and the location information is utilized to compute a distance between the STA and the respective first/second node 210: the respective test accounts for at least one of
    a) path loss on the respective $1^{st}/2^{nd}$ link,
    b) transmission rate on the respective $1^{st}/2^{nd}$ link, and
    c) antenna gain at either or both of the STA and the respective first/second node

Figure 2

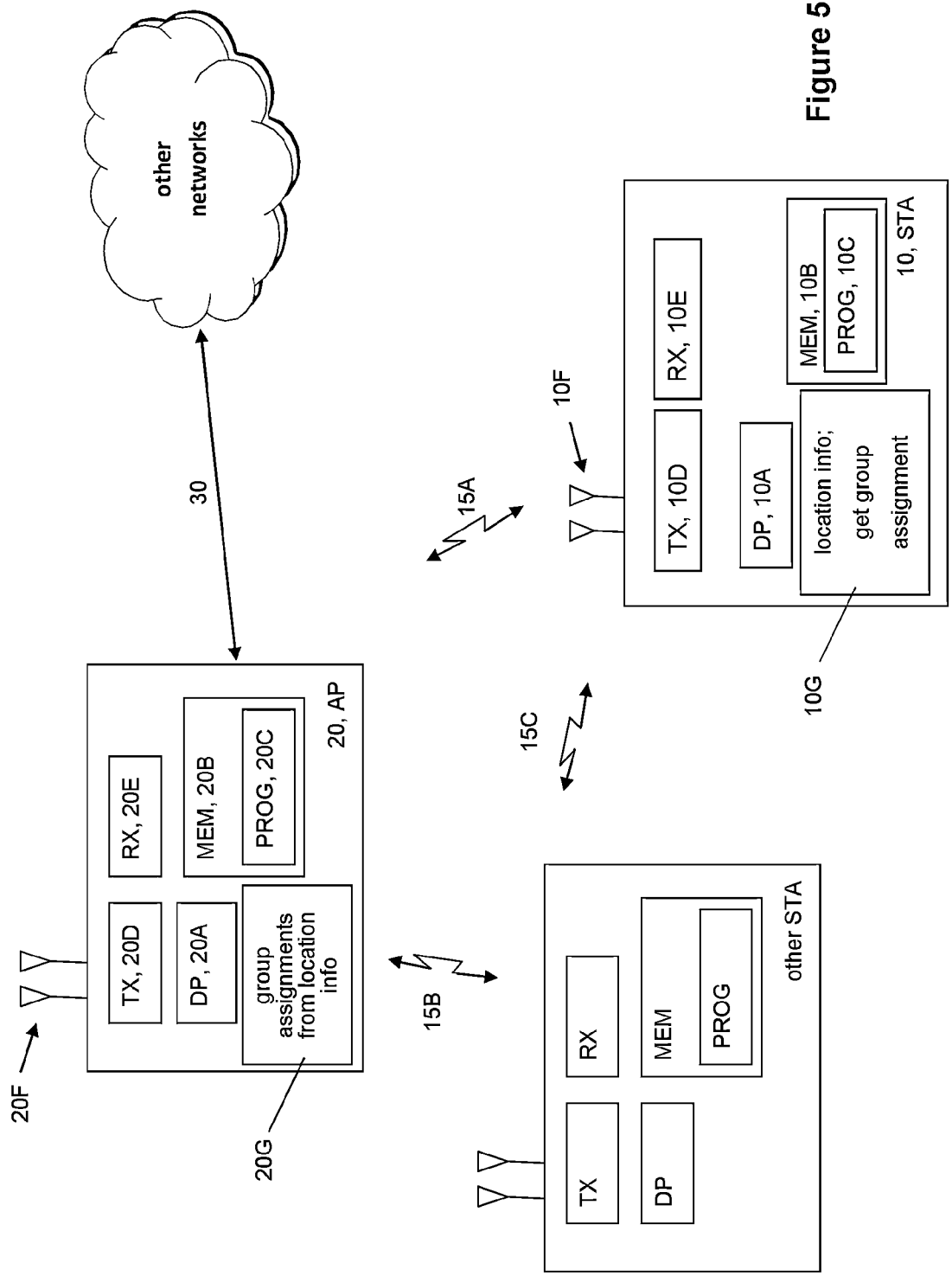

SECTORIZATION FOR GROUPING TERMINALS

CROSS REFERENCE TO RELATED APPLICATION

This application claims the benefit under 35 U.S.C. §119 and 37 CFR §1.55 to UK patent application no. 1216365.5, filed on Sep. 13, 2012, the entire content of which is incorporated herein by reference.

TECHNICAL FIELD

The exemplary and non-limiting embodiments of this invention relate generally to wireless communication systems, methods, devices and computer programs, and more specifically relate to assigning stations or users to groups in local wireless networks.

BACKGROUND

Development of the IEEE 802.11ah wireless system is progressing to address many different deployments or use cases for which earlier versions of wireless local area network (WLAN) specifications are not fully suitable. See for example document IEEE 802.11-11/0457r0 entitled POTENTIAL COMPROMISE FOR 802.11 AH USE CASE DOCUMENT by Rolf de Vegt, Qualcomm, March 2011. One such use case is a Smart Grid—Meter to Pole arrangement where the different stations are each associated with an electrical distribution or transmission point and wirelessly report various parameters of the electrical point they sense. In this case the single AP (access point) should be able to support several thousands of stations (STAs), where each sensor is associated with a STA to transmit its sensing data and receive any control information. Other use cases include environmental monitoring sensors; agriculture monitoring sensor systems in support of crops and livestock; industrial process sensors around large facilities such as petroleum refineries, steel smelters and pharmaceutical campuses; indoor healthcare monitoring such as in hospitals, homes and eldercare facilities; and others.

This wide variety of use cases leads to quite different assumptions for them. In some the stations (STAs) are assumed to be fixed in location while in others the STAs can be mobile. Some use cases will entail a low volume of data sent infrequently and where latency is not a major concern, whereas others may need to support higher data volumes and require low latency when data needs to be sent. One aspect many of these use cases reflects is the need to support a large number of STAs. When a large number of sensors/devices are associated with an AP, grouping of STAs is recognized as a means to control channel access, reduce collisions, and save energy.

There have been different proposals already for grouping stations. For example, co-owned UK Patent Application No. GB1119210.1 (filed on Nov. 7, 2011) provides that a STA's group assignment can be based on the device's MAC (Media Access Control) address or the assigned device identity such as the Association Identifier (AID). A STA belonging to a group may decide that its performance is not satisfactory and may request to change its group by proposing to the AP one or more different groups. The AP will either reject the STA's proposal or accept it by specifying the best group to be joined. In one embodiment the STA itself senses the potential groups it can join and identifies its best preference to the AP, and in another the STA may not have information about the potential groups to join so it indicates a performance indication such as a traffic rate requirement in its request to AP.

Another grouping concept is set forth in co-owned UK Patent Application No. GB1204209.9 (filed on Mar. 9, 2012). In that proposal each STA listens to the channel and to the interference that it experiences in each group, and the STA selects the group to join which is the group in which it has the best performance/least interference. Alternatively a STA may choose a group to join at random.

In both those co-owned UK patent applications the number of groups available and the assignment of STAs to groups is maintained by the AP. Performance is improved in both cases due to the group-wise restriction of which STAs can contend for channel access at any given time and the subsequent decrease in the number of collisions. Those concepts are effective grouping techniques and these teachings detail yet another way for assigning STAs to one of several groups under a single AP.

SUMMARY

In a first exemplary embodiment of the invention there is a method for operating a wireless communications device, the method comprising: utilizing location information for a station to test whether a first link between the station and a first node of a first group is sufficient; and assigning the station to the first group if the test indicates that the first link is sufficient, else utilizing the location information to test whether a second link between the station and a second node of a second group is sufficient.

In a second exemplary embodiment of the invention there is an apparatus for communicating comprising a processing system, in which the processing system comprises at least one processor and at least one memory including computer program code. In this aspect the processing system (the at least one memory and the computer program code with the at least one processor) is configured to cause the apparatus at least to: utilize location information for a station to test whether a first link between the station and a first node of a first group is sufficient; and assign the station to the first group if the test indicates that the first link is sufficient, else utilizing the location information to test whether a second link between the station and a second node of a second group is sufficient.

In a third exemplary embodiment of the invention there is a computer readable memory tangibly storing a set of instructions comprising: code for utilizing location information for a station to test whether a first link between the station and a first node of a first group is sufficient; and code for assigning the station to the first group if the test indicates that the first link is sufficient, else utilizing the location information to test whether a second link between the station and a second node of a second group is sufficient.

In a fourth exemplary embodiment of the invention there is a method for operating a wireless communications device, and this method comprises: dividing a geographic region in which an access point is located into a number of sectors, each sector associated with a group; and assigning a station to one of the groups based on location information of the station relative to the sectors.

In a fifth exemplary embodiment of the invention there is an apparatus for communicating comprising a processing system, and the processing system comprises at least one processor and at least one memory including computer program code. In this aspect the processing system (the at least one memory and the computer program code with the at least one processor) is configured to cause the apparatus at least to: divide a geographic region in which an access point is located into a number of sectors, each sector associated with a group; and assign a station to one of the groups based on location information of the station relative to the sectors.

In a sixth exemplary embodiment of the invention there is a computer readable memory tangibly storing a set of instructions comprising: code for dividing a geographic region in which an access point is located into a number of sectors, each sector associated with a group; and code for assigning a station to one of the groups based on location information of the station relative to the sectors.

BRIEF DESCRIPTION OF THE DRAWINGS

FIG. 2 is a logic flow diagram that illustrates, from the perspective of an access point which assigns STA members to groups, the operation of a method, and a result of execution of computer program instructions embodied on a computer readable memory, in accordance with a first exemplary embodiment of these teachings.

FIG. 5 is a non-limiting example of a simplified block diagram of a station being assigned to a group that is associated with an access point, and are exemplary electronic devices suitable for use in practicing some example embodiments of this invention.

DETAILED DESCRIPTION

While the examples below are in the context of an 802.11ah type of WLAN, this is a non-limiting example only. The specific examples used in these teachings may be easily adapted for other radio access technologies (RATs) such as various cellular systems operating in licensed or license exempt frequency bands (using carrier aggregation for example), Bluetooth personal area networks, and the like. In that regard, the AP in the below examples is exemplary for a generic wireless network access node and the STAs are exemplary user equipments (UEs), which may be implemented as automated sensor devices that may engage in machine-to-machine (M2M) type communications without direct human input.

Many of the prior art concepts for grouping UEs assume that geographic location information is simply not available for the UEs. This is particularly true in many of the proposals for grouping that are directed towards IEEE 801.11 ah type systems, since the large number of STAs in for example the smart-meter-to-pole use case scenario are intended to be fixed in location and inexpensive to manufacture and deploy. One goal of such prior art grouping techniques is to distribute the STAs among the various groups in order to reduce inter-STA transmission collisions. In this regard, by grouping subsets of the STAs together and by allowing contention at any given period of time to any subset the probability of collision decreases since less STAs are contending.

One of the assumptions behind the Smart Grid—Meter to Pole use case for 802.11 ah system deployments is that the pole-mounted sensors/remote STAs are inexpensive. That may be the direction currently but as 802.11ah systems become more common and new uses for them are devised, it is anticipated the remote STAs will need more capabilities, such as for example the ability to know their geographic location. Thus some local network deployments may be well served if there is location information available for the various STAs. Utilizing location information when forming the STAs into groups can also mitigate the "hidden terminal" problem which can arise when STAs are spaced far from one another such that they may potentially have interfering transmissions, without the additional signalling overhead of adding a request-to-send/clear-to-send RTS/CTS message exchange which is conventionally used to mitigate that problem.

The examples below assume that the STAs being grouped have their own geographic location information. They may obtain this for example using a global positioning system, such as Galileo or GLONASS, or from an inertial system or some combination of both as non-limiting examples. It is reasonable that at least some future deployments of local area networks will involve high-end stations with this capability.

Figure 1:
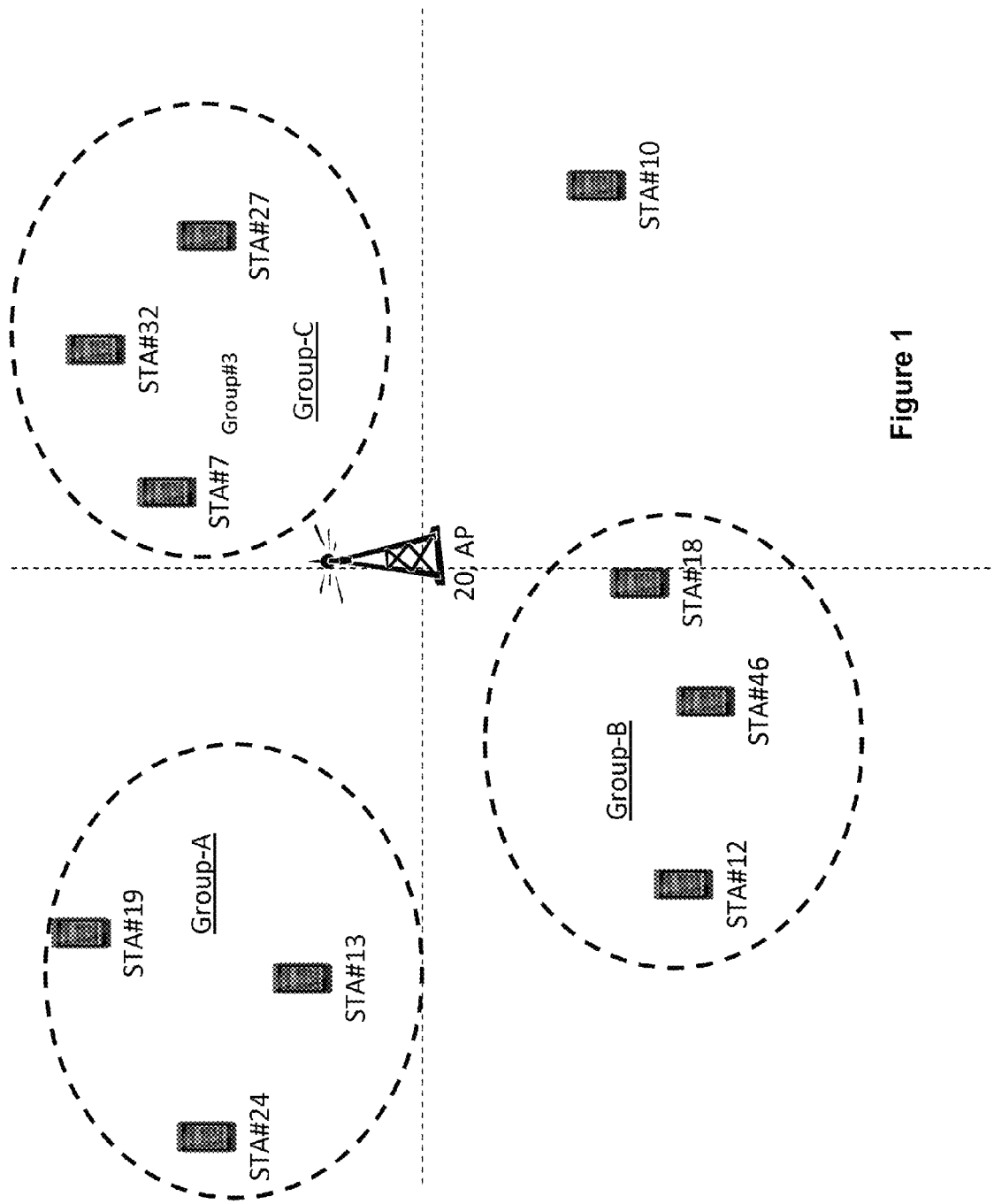
FIG. 1 is a schematic diagram illustrating three groups of stations associated to an access point and another station seeking to find which group to join in order to access the network, and is an example environment in which some embodiments of these teachings may be practiced to advantage.

FIG. 1 illustrates one example grouping scenario. Within Group-A are STA numbers 13, 19 and 24; within Group-B are STA numbers 12, 18 and 46; within Group-C are STA numbers 7, 27 and 32; and STA #10 is alone to represent a) that a given group may in an embodiment have only one member and b) as an exemplary STA (reference number 10) which is detailed further below with respect to FIG. 5. If the STAs are near enough to hear one another directly there will not be a hidden terminal issue. For example, STA#7 can hear STA#32 transmit to the AP and will set its network allocation vector accordingly, so it is advantageous to have these two STAs in the same group. STA#13 may be geographically too far to hear STA#32 directly and may possibly send a transmission that interferes with a transmission from STA#32, so STA#13 should be in a different group. The STAs in different groups access the channel at different times and so there is no interference of transmissions across groups.

There are at least two separate and independent advantages for grouping STAs. First, if there is a very large number of STAs there may not be a sufficiently large number of unique identifiers to assign to them. Grouping allows networks to be deployed even in the absence of this otherwise critical control resource. Second, in many radio access technologies such as for example WLAN and Bluetooth that cooperate in the license exempt radio band, there is a contention period where competing STAs having uplink (UL) data to send contend with one another for the channel, termed a distributed control function (DCF) in WLAN. And there are other contention-free periods where the STAs listen to polls and beacons from the AP to see if the AP has any downlink (DL) data to send them (and during which they can also send UL data). With a large number of STAs the different groups can be scheduled in a non-overlapping way for different instances of these contention and/or contention-free periods to relieve congestion and also to enable the STAs to enter a sleep mode for battery conservation. And where the STAs are also in close proximity to one another they can hear each other directly and avoid interfering with one another, even without an additional RTS/CTS signalling exchange, since it is very unlikely that two STAs which can hear each other directly will both attempt a transmission at the exact same moment in time.

Below are two embodiments for grouping the STAs using their geographic location information. This becomes more important when one considers that some of the use cases mentioned above for 802.11ah networks may involve quite widely spaced sensors. These different embodiments offer different technical effects which might be more suitable for one type of deployment use case than another. In each the AP uses location information from the STAs to assign the STAs into different groups.

According to a first exemplary embodiment of these teachings, if we index an individual one of N total STAs yet to be assigned to a group by the variable n and index each individual one of G total groups as the variable g, then for each STA n that needs to be assigned to a group the AP checks if that STA can be assigned to some group g. In this embodiment the AP has collected the geographic location information from each STA. Assuming for simplicity the use of Cartesian coordinates, the AP will then have in its local memory the x and y coordinates of STA n which are designated as $(x_n, y_n)$, and also the x and y coordinates $(x_m, y_m)$ of each other STA m that is in group g (as well as the coordinates of all other stations in all other groups).

From this information the AP can estimate the Euclidean distance between STA n and any other STA m as distance $d_{nm} = (x_n - x_m)^2 + (y_n - y_m)^2$. This simple computation assumes that the two nodes/STAs are generally on a same plane such as for example a relatively level agricultural deployment, but the distance can be obtained similarly in the presence of a third coordinate, for example to account for different floors of a hospital or of sensor locations in multi-story machinery in a heavy manufacturing deployment. The AP can also obtain the transmission powers of the STAs for its grouping calculations. Transmission powers in 802.11 networks are not time-varying (also in IEEE 802.11ah use cases the STA transmission powers are targeted to be fixed to 0 dBm) so there is no additional control signalling overhead for the AP learning this information. In other types of networks where transmission powers may be variable the STAs can report their transmission powers to the AP anytime they report their location information. Additionally, the AP may obtain the transmission rates of the STAs in terms of their used modulation and coding schemes.

From the above information, the AP can compute the range for the link between n and m, meaning if the transmission from n can be heard by m and vice versa, by using at least the distance $d_{nm}$ between them and the transmission powers of n and m. In a more detailed analysis example, the AP computes the link range in this embodiment additionally using the corresponding path losses (which depend on the channel model such as indoor or outdoor use cases), and optionally the antenna gains at n and m. In other embodiments the AP can compute the link range using the transmission rate for n and m on the link. Each device n and m is a certain type which gives its maximum transmission rate capability. If one device n can reach another device m while transmitting at the maximum rate for device n, then it will also be able to reach device m at any lower transmission rate. All of this basic information which the AP uses for its computations is reported by the individual STAs to the AP and stored.

If the AP's computations of transmission powers for STAs n to m suffice to support the links in both directions, that is, the available transmit power budget is sufficient for the range from n to m and from m to n, then the AP makes a similar computation for the next STA in that same group. If the transmit powers satisfy the link range for all members of group g, then the STA n is assigned to group g. This means that whenever n transmits to the AP, each STA m can hear its transmission and correspondingly set its network allocation vector (NAV). The same can be done when m transmits so that n sets its NAV.

Instead of testing the two-way transmission power for every member of a given group against some new STA n, the AP can instead check sufficiency of the transmission power only for the STA m that is a) already a member of given group g and b) spaced the furthest Euclidean distance from STA n. In this manner that furthest STA m can be regarded as a proxy for every other member and thus for the entire group g. This technique will be valid so long as there is not a large difference in channel conditions between STA n and STA m as compared to conditions between STA n and the other STAs in the same group whose transmission power is not being individually tested for sufficiency (or if STA m has the worst channel conditions of them all).

Whether testing transmit power sufficiency to support the link in either direction is for one STA-to-STA link or all of them in a group, if the transmit power is not sufficient for both link directions then the AP in this example embodiment tests that same STA n against STAs in another group.

There are several choices for the AP to make in this regard. STA n can be assigned to a new group that the AP introduces, and possibly also the AP re-assigns other STAs to this new group to balance the inter-group populations. STA n may instead be assigned to a different group which is already established, that is one of the remaining G-1 groups.

Or the AP can assign STA n to the group for which the transmit power sufficiency test failed in one or both directions, even though there will likely be a hidden terminal problem if the link is marginally not sustained (which means the link budget is somewhat higher than the STA capability). For example, rather than have STA#10 as the sole member of a new group in FIG. 1, the AP might instead assign STA#10 to Group-B even though the link between STA#10 and STA#12 failed the above sufficiency test. To better manage this possibility, there can be introduced a number designated as a 'critical threshold'. If the range that both STAs can support is less than the range of the link but are both still higher than the critical threshold then n may be assigned to the group. In this case, the AP would only add STA#10 to Group-B if the link between STA#10 and STA#12 meets that critical threshold (assuming that link is poorer than the other possible links between STA#10 and STAs #18 and 46).

The logic flow diagram of FIG. 2 illustrates some highlights of this first embodiment from the perspective of the AP. To distinguish nodes and UEs/STAs and groups this figure terms them as first, second, etc. So for example with reference to FIG. 1 the AP might be initially testing the link between UE/STA#10 and STA#18 in Group-B for sufficiency. Sufficiency in this regard means whether the available transmit power is sufficient that the tested link has an adequate quality of service, which might be measured as a minimum bit error rate/block error rate or any of many objective statistical measurements of quality that are known in the wireless arts.

Specifically, at block 202 the AP utilizes location information for a UE/STA to test whether a first link between the UE/STA and a first node of a first group is sufficient. At block 204 the AP assigns the UE/STA to the first group if the test indicates that the first link is sufficient, else the AP utilizes the location information to test whether a second link between the UE/STA and a second node of a second group is sufficient. In one embodiment above the UE/STA chooses the second node to be the one anticipated to have the worst link with the UE/STA (the node with the highest Euclidean distance), and in another embodiment the AP tests the link between the UE/STA and every member node of the first group until one is found insufficient and only then will the AP begin testing in the second group.

The remaining portions of FIG. 2 are optional for the first embodiment. Block 206 summarizes that the test of block 202, whether the first link is sufficient, is a two-way test which comprises testing of the link from the first node to the UE/STA and testing of the link from the UE/STA to the first node. Block 208 recalls the specifics that the respective test (the first-link test at block 202 and the second-link test at block 204) is whether, among other information, at least transmit power on the respective first and second link is sufficient to support the respective first and second link, and the location information is utilized to compute a distance between the UE/STA and the respective first and second node. And finally at optional block 210 the respective test accounts for at least one of a) path loss on the respective first and second link, b) transmission rate on the respective first and second link and c) antenna gain at either or both of the UE/STA and the respective first and second node.

The AP which performs some or all of the elements shown at FIG. 2 may in some embodiments assign the user equipment to the first group only if each link between the user equipment and each respective node of the first group is tested to be sufficient. If any link fails the sufficiency test then the AP goes on the test the UE/STA against the nodes of the second group, and so on. There are multiple ways to actually get the group assignment information to the UE/STA. In co-owned UK Patent Application No. GB1204209.9 mentioned in the background section above, there are contention factors $Q_n$ and deferral periods $T_n$ that are specific for a given $n^{th}$ group which give the distributed control function DCF periods for the group. While there are many ways for the AP to inform the UE/STA to which group it is assigned, and also many ways to define group-wise contention periods, in one non-limiting example the AP simply sends the UE/STA the group-specific contention factor and deferral period to inform it to which group the UE/STA is now assigned.

These group-specific contention factors and deferral periods, or any other manner which the AP informs the STA to which group it is assigned, can be sent in an Association Response message. Or in another embodiment there are newly defined messages for informing the STA to which group the AP has assigned it as a member.

Now consider the second embodiment. In this embodiment the STAs are placed in regions based on their x and y coordinates, and the regions may be considered in one non-limiting embodiment as adjacent triangle or pie-shapes with the AP at the center. In other approaches the regions can have other shapes; squares, rectangles, trapezoids, rhombuses, pentagons, and so forth (see FIG. 3C for example). The examples below utilize the pie-shaped regions to take advantage of the simple signalling involved for informing the STAs of the region boundaries, but these examples are easily extrapolated to other geometric or even irregular shapes for defining the regions.

For this second embodiment in which the groups are defined by geographic regions/sections, the number of regions/sections (e.g. pie slices) depends on the number of groups that the AP would like to maintain. Note that the AP can change the groupings and the total number of groups at least semi-statically, to account for different sensor nodes that may enter and leave the local network the AP is supporting. For the pie-shape example if we consider the AP itself to lie at location (0, 0) and the range of the network is considered to be equal to some distance R (mean radius), then the boundaries of the sectors can be computed easily. If there are only four sectors then the boundary lines run between the original (0, 0) where the AP lies and each of points (R, 0), (0, R), (-R, 0) and (0, -R). This is shown graphically at FIG. 3A.

For convenience the four sector example is also shown at FIG. 1 by means of the horizontal and vertical dashed lines. In this case it happens that the same STAs are all in the same groups but this will not always be true when comparing the group members defined by the first and by this second (4-sector) embodiments.

By way of contrast, if instead the AP chooses that there will be six sectors defined as pie-shapes with the AP at the origin (0, 0), then the sectors would be defined by lines from the origin to each of the points:

(R, 0)),
(R cos(30°), R sin(30°)),
(R cos(2*30°), R sin(2*30°)),
(R cos(3*30°), R sin(3*30°)),
(R cos(4*30°), R sin(4*30°)), and
(R cos(5*30°), R sin(5*30°)).

Figure 3A:
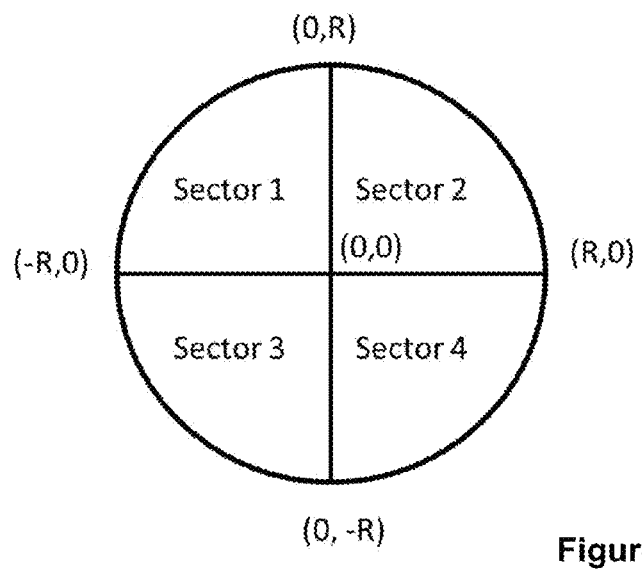
FIGS. 3A-C illustrate three exemplary sectorizations for group formation with the access point at the center, according to a second exemplary embodiment of these teachings.
Figure 3B:
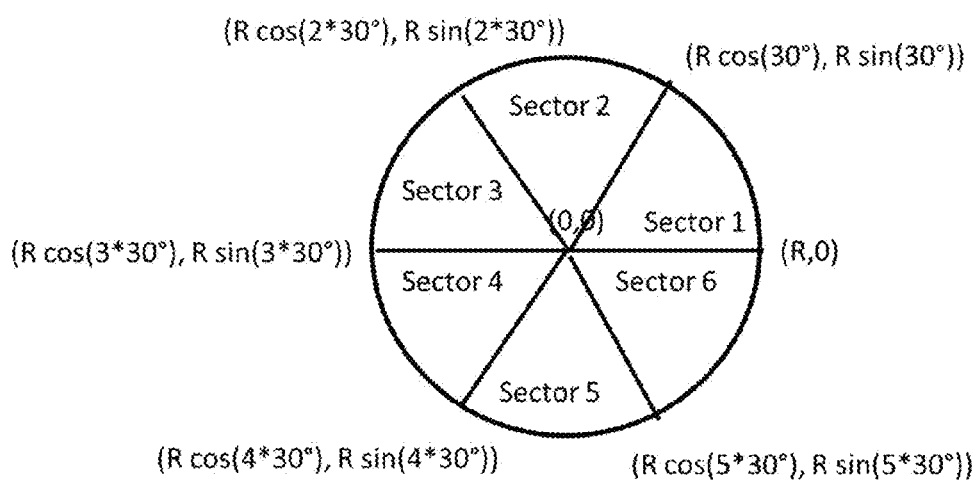

This six-sector example is shown graphically at FIG. 3B. More generally for any multi-sector case with angle theta $\Theta$, they would be given by (R, 0), (R cos($\Theta$), R sin($\Theta$)), (R cos(2*$\Theta$), R sin(2*$\Theta$)), (R cos(3*$\Theta$), R sin(3*$\Theta$)), . . . .

Figure 3C:
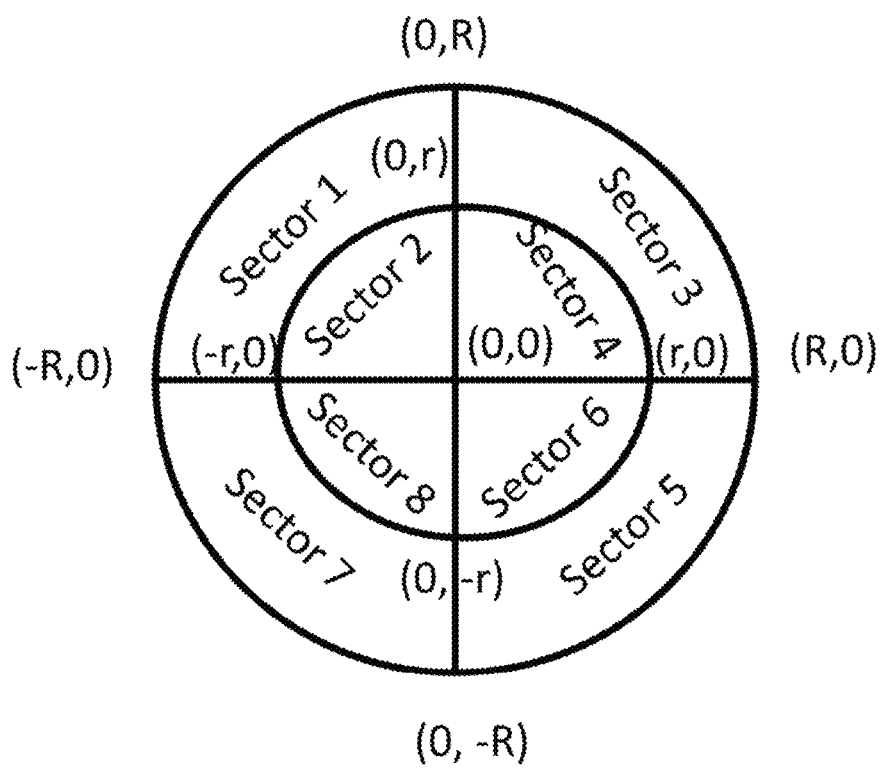

In another embodiment, whenever the AP establishes that the total number of groups is more than some predetermined threshold which is known to the STAs, the STAs will divide the triangular sectors between the origin (0, 0) and the outer radius R as shown by example at FIG. 3C in order to double the total number of sectors, and thus the number of groups. If for example the predetermined threshold is 7, when the AP signals there are 6 groups the STAs will know to sectorize according to FIG. 3B and when the AP signals there are 8 groups the STAs will know to sectorize according to FIG. 3C in which the triangular sectors are divided by a circle concentric about the origin (0,0) having radius r less than the largest/outer boundary radius R. The aforementioned threshold may depend on various system parameters, including the amount of interference the network receives from other networks/systems, the number of STAs associated with the AP, the number of groups the AP maintains, the range of the AP, etc.

Sectorization with inner and outer rings as in FIG. 3C can be advantageously used where some STAs might be subject to interference from nearby networks/systems. For example, if the network sectorized as shown in FIG. 3C uses a basic service set BSS that overlaps with that used in an adjacent system, there is a higher potential for the STAs grouped into the outer ring sectors to suffer interference with that other system, depending on which direction the other network/system might be located. The AP can allocate more scheduling time to those overlapping BSS areas/sectors to better assure that all STAs in the overlapping BSS regions will have sufficient transmitting opportunities and that they realize sufficient throughput. Stated more generally, if we consider the inner ring sectors 2, 4, 6 8 that are nearer the AP (0,0) as a first set of sectors and the outer ring sectors 1, 3, 5, 7 that are farther from the AP as a second set of sectors, then the AP allocates a longer time for channel use by a group associated with at least one sector of the second set as compared to any group that is associated with any sector of the first set.

Sectorization may continue in various different ways for even higher numbers of sectors/groups. For example 12 groups can be sectorized into the six triangular sectors shown FIG. 3B but with each triangle roughly bisected at radius r as in FIG. 3C, or it may be understood that the 12 sectors will be as in FIG. 3C but with only the outermost ring of sectors (between distances r and R from the center, sectors 1, 3, 5 and 7) shown at FIG. 3C being bisected again by a radian from the center (0,0). These sectorization configurations can be understood in advance for a given number of groups, or the AP can provide some signalling to the STAs to inform them how to sectorize the space into the AP's chosen number of groups. Specifically, a bit can be used to indicate the type of sectorization. For instance, the AP can indicate with a zero that 4 sectors correspond to the configuration of FIG. 3A and with a one that they correspond to 4 sectors comprising two inner and two outer ring sectors along the lines of FIG. 3C. This bit indicator can be sent e.g., in a broadcast message such as a Beacon along with other sectorization parameters. The STAs can decide the sectorization after receiving this signalling from the AP.

The inventors have conducted simulations, results of which have indicated throughput increases and packet loss reductions for this second embodiment as compared to an un-sectorized prior art method of assigning STAs into groups. Specifically, when four groups were established to which the STAs were assigned randomly according to a prior art grouping method, a total of 90,210 packets were moved at a rate equal to 256 kbit/s. Four sectorized groups according to FIG. 3A and the second embodiment of assigning STAs to groups resulted in moving a total of 141,888 packets for a throughput of 403 kbit/s.

With the simple pie-shaped sector shapes (e.g., 4, 6, etc. number of sectors) the AP may need to signal only the total number of groups/sectors and the STAs will then know (assuming only pie-shaped sectors are allowed) the boundaries for whatever value the AP sets for the number of groups G, since all sector sizes will be equal in this particular embodiment. If other shapes are allowed the AP will need to signal more detailed coordinates for defining the sector boundaries, and all sector shapes may not span the same geographic area.

In one aspect the STAs consider their own geographic location data and know from the sector boundaries which group they are in. They may need to still signal the AP to inform it that they are in a specific $g^{th}$ group, or they may instead signal their coordinates to the AP which will then plot the STA position which sets its group membership.

But in a different aspect of this second embodiment the STAs in the network decide their allocation in groups by emulating the cutting-pie sectorization case above (or emulating whatever shapes are defined by the boundaries which the AP signals) but utilizing some radio-defined boundaries for the sectors rather than the geographic boundaries shown at FIGS. 3A-B. This is more clearly explained by an example; consider the case in which the AP decides a number of groups G in which the STAs will be divided. The AP then chooses a total of G STAs from among the total number of STAs, one per each of the G groups and the AP uses the STA coordinates so as to choose the G STAs such that one and only one lies in each sector, preferably nearest the sector center as possible or similarly these G STAs are chosen to maximize the Euclidean distance between adjacent pairs of them. As noted above, the Euclidean distance can be two-dimensional/planar, or alternatively if there is an appreciable vertical/third component among the various sensor nodes/STAs this maximized distance can be three dimensional. Or in another embodiment the AP can simply choose a number R of the STAs at random. Consider these R STAs the 'seed' members, one per group.

Now having been selected by the AP, each of the G seed member STAs exchanges messages with its neighbors. Consider one of these seed member STAs as STA#46 of FIG. 1. STA#46 broadcasts or unicasts a message to its one-hop neighbors, which in FIG. 1 are STA#18, STA#12, and the AP (which for this description is not considered further since the AP itself will not become a group member). If the one-hop neighbors do not belong already to a group they will be assigned to the same group as STA#46.

Next, all the members belonging in the same group continue to broadcast/unicast to their neighbors. So in this case the one-hop neighbors of STA#12 are STA#13, STA#46 and STA#18. Any of the one-hop neighbors which do not belong already to a group will be assigned to the same group as the node(s) sending the broadcast/unicast messages, STA#12 in this case. If STA#13 were not already within Group-A it would hear the one-hop message from STA#12 and join Group-B, but if STA#13 were already a member of Group-A it would not change groups and would not respond to those other broadcast/unicast messages from STA#12 or from any other STA in other groups. The process ends when all nodes are assigned to a group. In this manner the exact boundaries should still follow the sectors shown at FIGS. 3A-B, but only roughly since in this case the boundaries are radio-defined rather than geographically defined.

In this second embodiment the AP will need to inform the STAs the points of the sectors. A STA knowing its x and y coordinates (and z where this extra spatial dimension is sufficiently useful for network grouping purposes) and the points on the circumference of the different sectors can calculate the sector in which it belongs. This information can also be sent in the Association exchange messages or in newly defined messages. Or in another embodiment the AP can use its broadcast system information to inform the STAs of the number of groups and/or of the sector boundaries if more than only simple pie-shaped sectors are being used.

Figure 4:
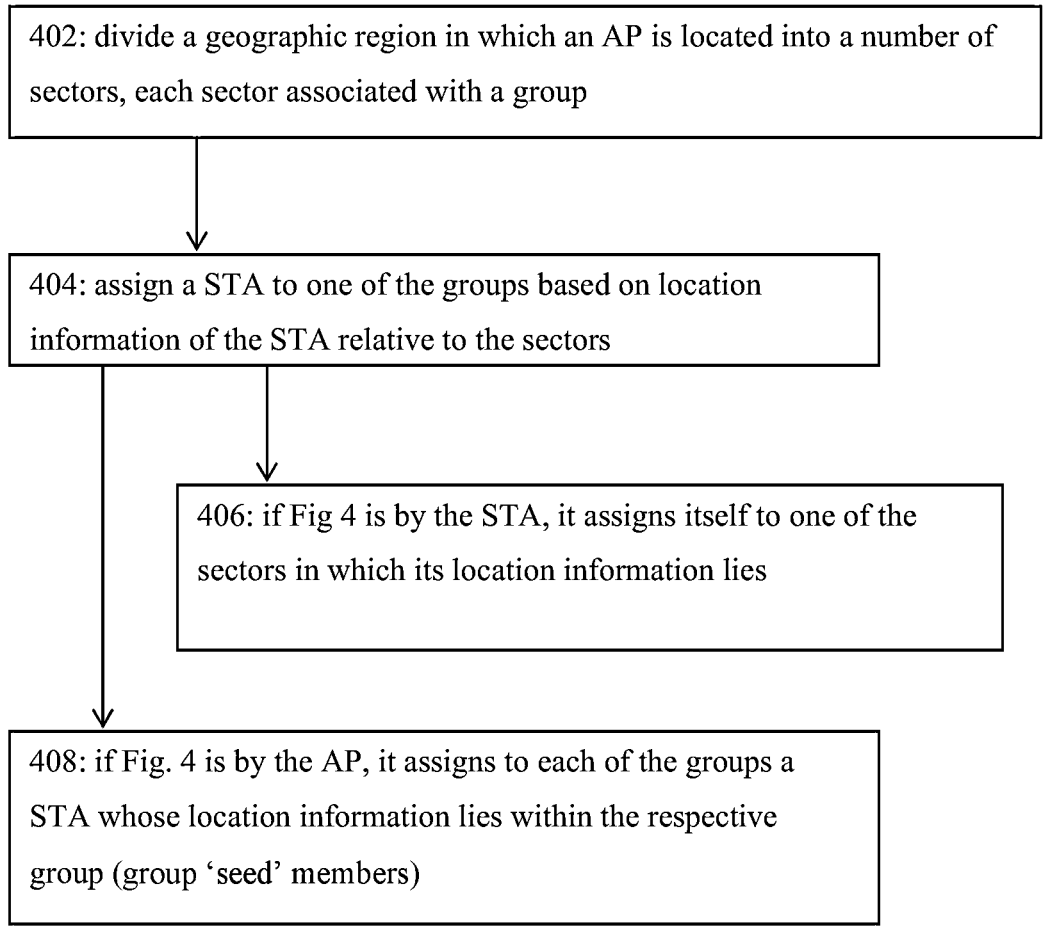
FIG. 4 is a logic flow diagram that illustrates, from the perspective of an access point which assigns STA members to groups, the operation of a method, and a result of execution of computer program instructions embodied on a computer readable memory, in accordance with the sectorization grouping of the second exemplary embodiment of these teachings.

The logic flow diagram of FIG. 4 illustrates some highlights of this second embodiment, which may be from the perspective of the STA or of the AP. At block 402 the device/STA/AP divides a geographic region in which an AP is located into a number of sectors, each sector associated with a group. The AP does this sectorization itself, and the STA also does the dividing into sectors by using, for example the number of total sectors or the boundary points which it learns from the AP's signalling. Then at block 404 the device/STA/AP assigns a STA to one of the groups based on location information of the station relative to the sectors.

Block 406 details block 404 from the perspective of the STA; it assigns itself to one of the sectors in which its location information lies. In one embodiment the station determines the number of sectors directly from wireless signalling received from the AP, such as when the sectors are pie-shaped and the AP need only to signal an indication of the number R in order to fully define the sector boundaries for all the STAs. In another embodiment the STA determines the number of sectors from sector boundary information that it wirelessly receives from the AP.

Block 408 details block 404 from the perspective of the AP; it assigns to each of the groups a STA whose location information lies within the respective group. These were detailed above as the 'seed' members or seed STAs. Also in the above example the AP selected the STAs for assigning to the respective groups by assessing a maximum distance between adjacent stations and selecting those R STAs having the maximum Euclidean distance between adjacent ones of the STAs. And as detailed above with respect to FIG. 3C where at least a first set of sectors is nearer the AP than a second set of sectors, the AP can allocate a longer time for channel use by a group associated with at least one sector of the second set as compared to any group associated with any sector of the first set.

Exemplary embodiments of these teachings provide at least some of the following technical effects. These teachings can eliminate the hidden terminal problem mentioned above, as well as reduce transmission delays by avoiding collisions and thereby avoiding increasing the STA's backoff window wait time. Avoiding such collisions also saves on energy, particularly important for mobile STAs with a limited battery reserve of energy. At least for the second embodiment the inventors' testing has shown considerable throughput gains.

The various logic flow diagrams above at FIGS. 2 and 4 may each be considered to illustrate the operation of a method for operating a wireless communications device, and a result of execution of a computer program stored in a computer readable memory, and a specific manner in which components of an electronic device are configured to cause that electronic device to operate, whether such an electronic device is one of the STAs, the AP, or one or more components therefore such as a modem, chipset, or the like.

Such blocks and the functions they represent are non-limiting examples, and may be practiced in various components such as integrated circuit chips and modules, and that the exemplary embodiments of this invention may be realized in an apparatus that is embodied as an integrated circuit. The integrated circuit, or circuits, may comprise circuitry (as well as possibly firmware) for embodying at least one or more of a data processor or data processors, a digital signal processor or processors, baseband circuitry and radio frequency circuitry that are configurable so as to operate in accordance with the exemplary embodiments of this invention.

Such circuit/circuitry embodiments include any of the following: (a) hardware-only circuit implementations (such as implementations in only analog and/or digital circuitry) and (b) combinations of circuits and software (and/or firmware), such as: (i) a combination of processor(s) or (ii) portions of processor(s)/software (including digital signal processor(s)), software, and memory(ies) that work together to cause an apparatus, such as a mobile phone/UE, to perform the various functions summarized at FIGS. 2 and/or 4) and (c) circuits, such as a microprocessor(s) or a portion of a microprocessor(s), that require software or firmware for operation, even if the software or firmware is not physically present. This definition of 'circuitry' applies to all uses of this term in this specification, including in any claims. As a further example, as used in this specification, the term "circuitry" would also cover an implementation of merely a processor (or multiple processors) or portion of a processor and its (or their) accompanying software and/or firmware. The term "circuitry" also covers, for example, a baseband integrated circuit or application specific integrated circuit for a mobile phone/user equipment or a similar integrated circuit in a server, a cellular network device, or other network device.

Reference is now made to FIG. 5 for illustrating a simplified block diagram of various electronic devices and apparatus that are suitable for use in practicing some example embodiments of this invention. In FIG. 5 a wireless network represented by the AP 20, or more generally an access node if these teachings are implemented in other than a WLAN environment, is adapted for communication over a wireless link 15A with an apparatus such as a station 10 or more generally a portable radio device such as a user equipment UE. The AP 20 also has a wireless link 15B with the other STA which represents all the other STAs under control of that AP 20. The network may also provide connectivity via data/control path 30 with a broader network (e.g., a cellular network and/or a publicly switched telephone network PSTN and/or a data communications network/Internet).

The station 10 includes processing means such as at least one data processor (DP) 10A, storing means such as at least one computer-readable memory (MEM) 10B storing at least one computer program (PROG) 10C, and communicating means such as a transmitter TX 10D and a receiver RX 10E for bidirectional wireless communications with the network access point 20 via one or more antennas 10F. Also stored in the MEM 10B at reference number 10G is the station's means for obtaining its location information and the rules for using the location information to determine what station it is assigned.

The access point 20 also includes processing means such as at least one data processor (DP) 20A, storing means such as at least one computer-readable memory (MEM) 20B storing at least one computer program (PROG) 20C, and communicating means such as a transmitter TX 20D and a receiver RX 20E for bidirectional wireless communications with the station 10 and other station via one or more antennas 20F. The AP 20 also has a program stored in its local memory for making the group assignments using the stations' location information as shown at 20G.

While not particularly illustrated for the station 10 or AP 20, those devices are also assumed to include as part of their wireless communicating means a modem which may be inbuilt on an RF front end chip within those devices 10, 20 and which also carries the TX 10D/20D and the RX 10E/20E.

At least one of the PROGs 10C/10G/20C/20G in the station 10 and/or in the AP 20 is assumed to include program instructions that, when executed by the associated DP 10A/20A, enable the device to operate in accordance with the exemplary embodiments of this invention, as detailed above particularly with respect to FIGS. 2 and 4. In this regard the exemplary embodiments of this invention may be implemented at least in part by computer software stored on the MEM 10B, 20B which is executable by the DP 10A of the station 10 and/or by the DP 20A of the access point 20, or by hardware, or by a combination of tangibly stored software and hardware (and tangibly stored firmware). Electronic devices implementing these aspects of the invention may not be the entire station 10 or AP 20, but exemplary embodiments may be implemented by one or more components of same such as the above described tangibly stored software, hardware, firmware and DP, modem, system on a chip SOC or an application specific integrated circuit ASIC.

In general, the various embodiments of the station 10 can include, but are not limited to personal portable digital devices having wireless communication capabilities, including but not limited to user equipments, cellular telephones, navigation devices, laptop/palmtop/tablet computers, digital cameras and Internet appliances, as well as machine-to-machine devices which operate without direct user action.

Various embodiments of the computer readable MEMs 10B, 20B include any data storage technology type which is suitable to the local technical environment, including but not limited to semiconductor based memory devices, magnetic memory devices and systems, optical memory devices and systems, fixed memory, removable memory, disc memory, flash memory, DRAM, SRAM, EEPROM and the like. Various embodiments of the DPs 10A, 20A include but are not limited to general purpose computers, special purpose computers, microprocessors, digital signal processors (DSPs), and multi-core processors.

Some of the various features of the above non-limiting embodiments may be used to advantage without the corresponding use of other described features. The foregoing description should therefore be considered as merely illustrative of the principles, teachings and exemplary embodiments of this invention, and not in limitation thereof.

What is claimed is:

1. A method for operating a wireless communications device, comprising:
   utilizing geographic location information of a station to determine a first node of a plurality of nodes belonging to a first group, the fist node being a furthest Euclidean distance from the station than other nodes in the plurality of nodes belonging to the first group;
   determining whether the station and the first node can communicate based on communications between the station and the first node;
   assigning the station to the first group if the first node and the station can communicate;
   if the station and the first node cannot communicate, utilizing the geographic location information of the station to determine a second node of a plurality of nodes belonging to a second group, the second node being a furthest Euclidean distance from the station than other nodes in the plurality of nodes belonging to the second group;
   determining whether the second node and the station can communicate based on communications between the station and the second node; and
   assigning the station to the second group if the second node and the station can communicate, the station not being assigned to the second group if the second node and the station cannot communicate,
   wherein determining whether the first node and the station can communicate is further based on at least two of:
   transmission rate on respective first and second links between the first node and the station;
   path loss on the respective first and second links; and
   antenna gain at either or both of the station and the first node.

2. The method according to claim 1, wherein determining whether the station and the first node can communicate includes a two way test comprising testing communication via a link from the first node to the station and testing communication via a link from the station to the first node.

3. An apparatus for communicating comprising:
   at least one processor and at least one memory, the processor being configured to:
   utilize geographic location information of a station to determine a first node of a plurality of nodes belonging to a first group, the first node being a furthest Euclidean distance from the station than other nodes in the plurality of nodes belonging to the first group;
   determine whether the station and the first node can communicate based on communications between the station and the first node;
   assign the station to the first group if the station and the first node can communicate; and
   if the first node and the station cannot communicate, utilize the geographic location information of the station to determine a second node of a plurality of nodes that belong to a second group, the second node being a furthest Euclidean distance from the station than other nodes in the plurality of nodes that belong to the second group;
   determine whether the second node and the station can communicate based on communications between the station and the second node; and
   assign the station to the second group if the station and the second node can communicate, the station not being assigned to the second group if the second node and the station cannot communicate,
   wherein determination of whether the first node and the station can communicate is further based on at least two of:
   transmission rate on respective first and second links between the first node and the station;
   path loss on the respective first and second links; and
   antenna gain at either or both of the station and the first node.

4. The apparatus according to claim 3, wherein the processor determines whether the first node and the station can communicate using a two way test comprising a test of communication via a link from the first node to the station and a test of communication via a link from the station to the first node.

5. The apparatus according to claim 3, wherein in which whether the first node and the station can communicate is determined based on transmit power of the first node and the station.

6. The apparatus according to claim 3, wherein in which the apparatus comprises an access point and the processor further determines whether the station is able to communicate with each of the plurality of nodes in the first group, and assigns the station to the first group only if the station is able to communicate with each of the plurality of nodes in the first group.

7. The apparatus according to claim 6, wherein the processor is further configured to cause the apparatus to send, to the station, contention factors which are specific for the first group when the station is assigned to the first group.

8. A non-transitory computer-readable medium encoded with computer-readable instructions thereon that, when executed by a processor, cause the processor to perform a method comprising:
   utilizing geographic location information of a station to determine a first node of a plurality of nodes belonging to a first group, the first node being a furthest Euclidean distance from the station than other nodes of the plurality of nodes belonging to the first group;
   determining whether the station and the first node can communicate based on communications between the station and the first node;
   assigning the station to the first group if the station and the first node can communicate;
   if the station and the first node cannot communicate, utilizing the geographic location information of the station to determine a second node of a plurality of nodes belonging to a second group, the second node being a furthest Euclidean distance from the station than other nodes in the plurality of nodes belonging to the second group;

determining whether the station and the second node can communicate based on communications between the station and the second node; and assigning the station to the second group if the station and the second node can communicate, the station not being assigned to the second group if the second node and the station cannot communicate, wherein determining whether the first node and the station can communicate is further based on at least two of:

transmission rate on respective first and second links between the first node and the station;

path loss on the respective first and second links; and antenna gain at either or both of the station and the first node.

9. The non-transitory computer-readable medium according to claim 8, wherein determining whether the station and the first node can communicate includes a two way test of testing communication via a link from the first node to the station and testing communication via a link from the station to the first node.

* * * * *